Dec. 25, 1956 T. G. KIRBY 2,775,119
DYNAMOMETRY
Filed June 2, 1953

T. G. KIRBY
INVENTOR.

BY
ATTORNEYS

United States Patent Office 2,775,119
Patented Dec. 25, 1956

2,775,119

DYNAMOMETRY

Thomas G. Kirby, Ecorse, Mich., assignor to Ford Motor Company, Dearborn, Mich., a corporation of Delaware Application June 2, 1953, Serial No. 359,153

4 Claims. (Cl. 73—134)

This invention is concerned with the science of dynamometry and more particularly with a simplified dynamometer especially suitable for the measurement of the performance of very high speed low torque apparatus. This device is particularly adaptable for the precise measurement of the characteristics of gas turbines.

The conventional dynamometry machinery as applied to a high speed gas turbine encounters difficulties due to the necessity of either operating at full turbine speed or introducing reduction gears between the turbine and the electric generator ordinarily employed to absorb the turbine energy. Attempts to drive the electric generator absorbing the energy at full turbine speed have been found impractical due to commutation difficulties and the difficulty of winding a direct current armature to resist the centrifugal forces at such high speeds. The use of reduction gears and direct current machinery is further plagued by the fact that brush and gear friction become a substantial portion of the torque developed.

The array of machinery comprising this invention is best understood by reference to the drawings in which—

Figure 1:
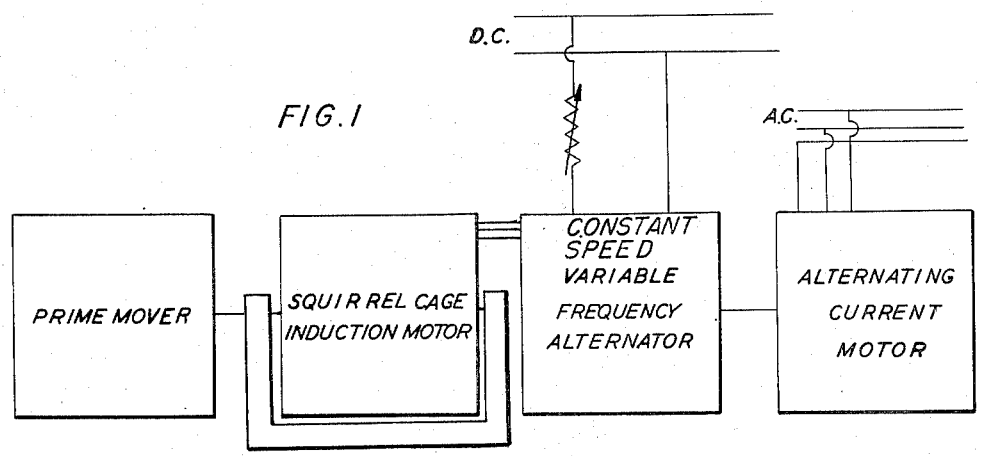
Figure 1 is a block showing of one form of the invention.

In this invention the key element is the variable speed alternator shown interposed between the squirrel cage induction motor and the alternating current motor or the direct current motor. To be successful this alternator must be capable of delivering a constant frequency despite variations in rotational speed or conversely to maintain a constant speed and deliver a variable frequency. Additionally, this machine must be relatively insensitive to torque. Such a machine is described in U. S. Patent 522,241, issued July 3, 1894, to Thomson and in copending application Serial No. 359,984, filed June 3, 1953, by Kirby et al.

In the drawings it will be noted that the action is initiated by the prime mover on the left of the illustrations. This prime mover may well be a gas turbine although the invention is by no means so restricted. The prime mover is connected directly to a standard squirrel cage induction motor with the rotator modified if necessary to resist the centrifugal forces at the speed at which it is to be operated. This motor is cradled as shown to permit torque measurements. The squirrel cage motor is directly connected to the prime mover and rotates at the same speed. The squirrel cage induction motor is electrically connected to the variable speed alternator through a standard three phase circuit but is not connected to the variable speed alternator mechanically. The variable speed alternator is directly and mechanically connected to an alternating current motor (Figure 1) which in turn is electrically connected to an ordinary commercial three phase line. It will be noted that the variable speed alternator is also connected to a direct current line through a variable resistor.

Figure 2:
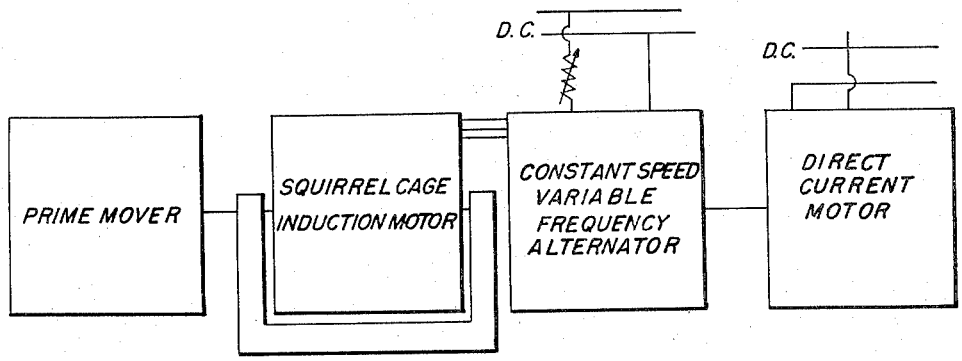
Figure 2 is a block showing of another form of the invention.

Figure 2 is similar to Figure 1 except that a direct current motor has replaced the alternating current motor and is connected to a direct current power network. The systems are otherwise the same.

The variable speed alternator may be described as a direct current generator in which the field pieces have been laminated and in which the brush carriage supporting all of the brushes is rotatable as a unit and in which the energy is removed from the rotating brushes through slip rings. Such a device may be produced from an ordinary direct current shunt generator by laminating the field and rotating the brush assembly by any desired means such as a motor coaxial with the main motor or by an external mechanical drive. Such a modified direct current generator will produce an alternating current whose frequency is only a function of the speed of rotation of the brush carriage and is independent of the speed of the motor per se. This alternating current would be single phase since the brushes are spaced electrically 180 degrees apart. It is a simple matter to electrically space the brushes 120 degrees apart and to add a third slip ring to obtain conventional three phase energy from this variable speed alternator. In the drawing the three phase version has been shown. It is usually more convenient to supply the excitation to the variable speed alternator field from an external direct current source through a variable resistor as is shown rather than to rely on self-excitation.

The operation of the dynamometer shown in the drawing is as follows. With the field of the variable speed alternator deenergized the prime mover and squirrel cage induction motor are set in motion as are the alternating current motor and variable speed alternator. The electrical speed of rotation of the induction motor is synchronized with the electrical speed of rotation of the brush carriage of the variable speed alternator. The field of the variable speed alternator is now slowly energized and the output of the variable speed alternator serves to supply excitation to the squirrel cage induction motor. As long as synchronism is maintained between the electrical speed of the squirrel cage induction motor and the brush carriage of the variable speed alternator there will be no substantial transfer of energy from the prime mover through the squirrel cage induction motor, the variable speed alternator and the alternating current motor into the alternating current line. To initiate the transfer of energy from the prime mover to the alternating current line the electrical speed of the brush carriage motor should be reduced somewhat below the synchronous electric speed of the squirrel cage induction motor at which time the squirrel cage induction motor will function as an induction generator and feed power through the variable speed alternator into the alternating current motor and out to the incoming alternating current line. It is to be understood that the stator of the squirrel cage induction motor is to be mechanically cradled for the measurement of torque as is conventionally done in dynamometry.

As a matter of convenience the dynamoelectric machine mechanically driven by the variable speed alternator has been shown as an alternating current motor. This may be a synchronous or an asynchronous motor although a synchronous motor is preferred. It is obvious that a direct current motor may be substituted for the alternating current if it is desired to transfer the prime mover energy to a direct current system, or an ordinary friction load may be employed.

I claim as my invention:

1. A high speed dynamometer comprising a squirrel cage induction motor cradled to permit the mechanical measurement of torque and arranged to be mechanically connected to a prime mover, a variable frequency, constant speed alternator electrically connected to but mechanically independent of said squirrel cage induction motor and an alternating current motor connected only mechanically to said variable frequency alternator for transferring energy to a power system.

2. A high speed dynamometer comprising a squirrel cage induction motor cradled to permit the mechanical measurement of torque and arranged to be mechanically connected to a prime mover, a variable frequency, constant speed alternator electrically connected to but mechanically independent of said squirrel cage induction motor and an alternating current motor connected only mechanically to said variable frequency alternator for transferring energy to a power system, said variable frequency, constant speed alternator comprising essentially a shunt wound laminated field direct current machine in which the brushes and brush carriage are continuously rotatable and in which the armature current is removed through slip rings mounted upon the rotatable brush carriage.

3. A high speed dynamometer comprising an induction motor cradled to permit mechanical measurement of torque and arranged to be mechanically connected to a prime mover, a variable frequency constant speed alternator electrically connected to but mechanically independent of said squirrel cage induction motor and a load absorbing device mechanically connected to said variable frequency, constant speed alternator.

4. A high speed dynamometer comprising an induction motor cradled to permit mechanical measurement of torque and arranged to be mechanically connected to a prime mover, a variable frequency constant speed alternator electrically connected to but mechanically independent of said squirrel cage induction motor and a direct current motor mechanically connected to said variable frequency, constant speed alternator.

References Cited in the file of this patent
UNITED STATES PATENTS

| Number | Name | Date |
|---|---|---|
| 522,241 | Thomson | July 3, 1894 |
| 2,436,345 | Wrathall | Feb. 17, 1948 |
| 2,440,076 | Cassidy | Apr. 20, 1948 |
| 2,445,095 | Winther | July 13, 1948 |